UNITED STATES PATENT OFFICE.

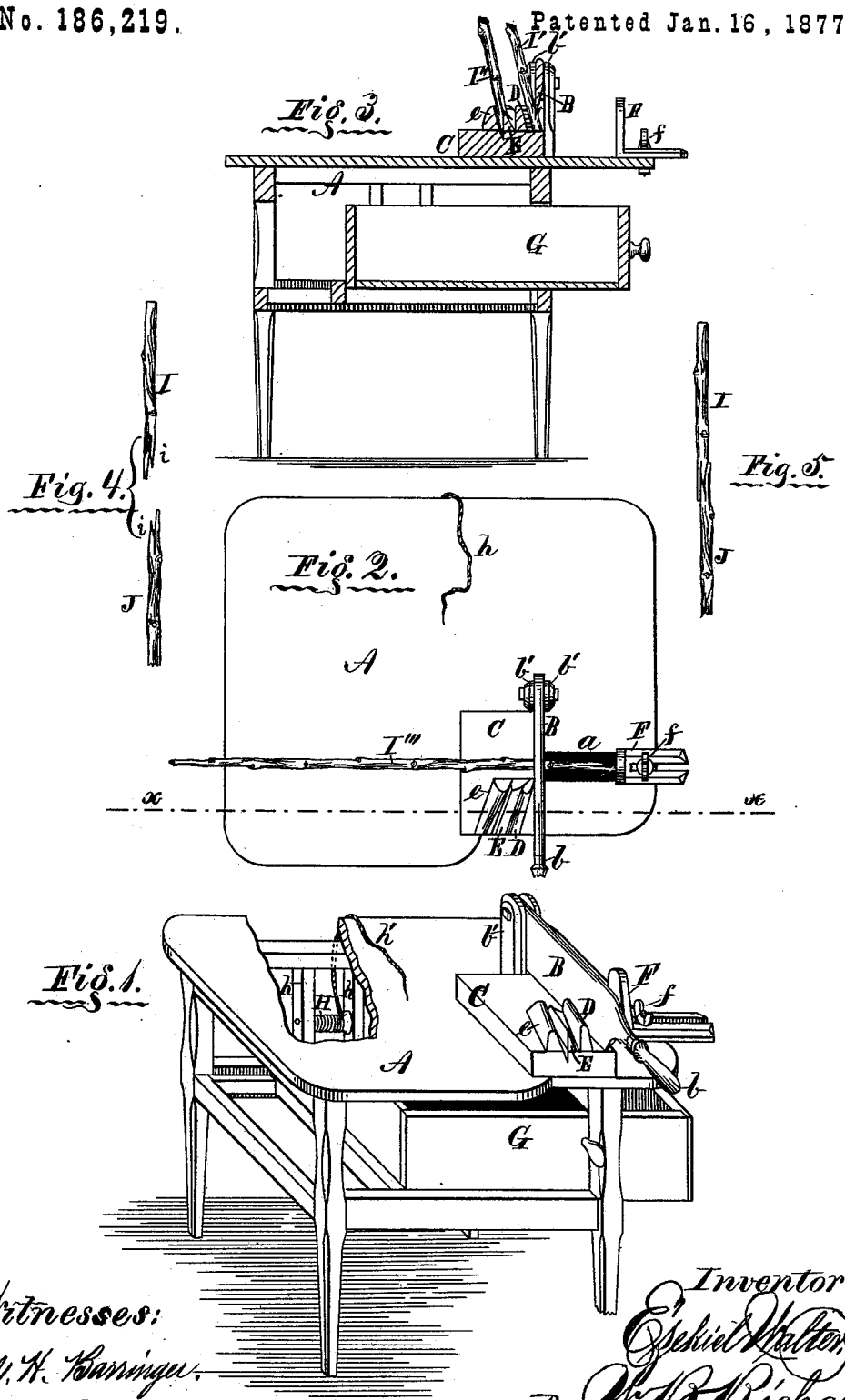

EZEKIEL WALTERS, OF BOWENSBURG, ILLINOIS.

IMPROVEMENT IN GRAFTING-MACHINES.

Specification forming part of Letters Patent No. 186,219, dated January 16, 1877; application filed February 1, 1876.

*To all whom it may concern:*

Be it known that I, EZEKIEL WALTERS, of Bowensburg, county of Hancock, and State of Illinois, have invented certain Improvements in Grafting-Machines, of which the following is a full, clear, and exact description, reference being had to the annexed drawing, making part of this specification, in which—

Figure 1 is a perspective view of a machine embodying my invention, partly broken away. Fig. 2 is a top-plan view. Fig. 3 is a sectional view in a vertical plane through line $x$ $x$ at Fig. 2. Figs. 4 and 5 are specimens of prepared grafts, hereinafter referred to.

My invention relates to a machine or implement for preparing nursery stock—that is, for preparing scions and stocks of young trees for that kind of grafting generally known as "tongue-grafting;" and the invention consists in a machine by means of which the cutting of the scions and stocks and the uniting of the same to form a graft can be quickly and conveniently accomplished, all as hereinafter more fully set forth.

Similar letters refer to like parts.

Letter A represents a table of any suitable construction. B is a cutter or blade, with a handle, $b$, at one end, and pivoted at its other end between standards $b'$ $b'$. C is a cutting-block, mounted on the table A. D is a guide-block, its face toward the cutter B, inclined therefrom upward at the angle desired for the slope to be cut on the scions and stocks, as shown at Figs. 1 and 3, and standing at an angle lengthwise to the cutter B, as shown at Figs. 2 and 1, so that different-sized wood may be operated upon. E is a V-shaped blade mounted on the block C, as shown in the drawing. $e$ is a guide-block, its distant end very close to the blade or cutter E, and lying at an angle thereto, as shown at Figs. 1 and 2, for purposes hereinafter described. F is a guide, adjustable in its distance from the blade B by means of a thumb-screw, $f$. G is a sliding drawer in the table A. $a$ is a hole in the top of the table A. H is a spool, supported by standards $h$ in one side of the table A, and carries a thread or cord, $h'$. I I' I'' I''' are scions, and J J J are stocks.

The operation is as follows: The oblique cut or sloping side of the scion or stock is made by placing it in the position shown by I' at Fig. 3. The cuneiform or wedge-shaped end of the scion or stock is then inserted between the cutter E and block $e$, and pressed downward, as shown by I'' at same figure, until the cutter E strikes the sloping side and enters the scion or stock, throwing out the tongue $i$. For larger and smaller scions or stocks the cutter E is nearer the guide $e$ at one end than at the other. The scion may now be placed as shown at I''', Fig. 2, with its end against the gage F, and cut off the desired length by the cutter B, when, falling through the opening $a$, it will be received in the drawer G.

It may be necessary to explain that this machine is intended for use in the preparation of nursery stock, and not for grafting in the limbs of old trees.

The stocks herein spoken of are small seedlings or roots raised from seed, which are taken from the ground in the fall of the year.

In forming the grafts I prefer to prepare the scions first, and when a sufficient quantity is ready I then proceed to prepare the stocks.

The young seedlings are cut off about four inches from the roots, and their ends prepared, as before described, by the machine. I then place the stocks and scions together, as shown in Fig. 5 of the drawing, and secure them with a cord, $h'$, from the spool H, which is wrapped around the united stock and scion, and secured by a knot. The graft is then complete, and the nursery stock thus prepared is packed away in boxes until the spring, when they are planted in the nursery. The thread with which they are bound soon rots in the ground, so as not to prevent the swelling of the wood as the grafted seedling grows.

The work of grafting is all done during the winter time and within doors.

Having thus described my invention, what I claim as new, and desire to secure by Letters Patent, is—

1. The pivoted blade or cutter B, operating in combination with the inclined guard or guide D, to cut the sloping sides of the stocks and scions, substantially as and for the purpose specified.

2. The V-shaped cutter E and guide-block $e$, arranged relatively as described, to split stocks and scions of different sizes, substantially as set forth.

EZEKIEL WALTERS.

Witnesses:
WILLIAM GRAHAM,
JONATHAN TARR.